(No Model.) 5 Sheets—Sheet 3.
W. S. GREENING.
COMBINED PLOW AND PLANTING MECHANISM.
No. 348,204. Patented Aug. 31, 1886.
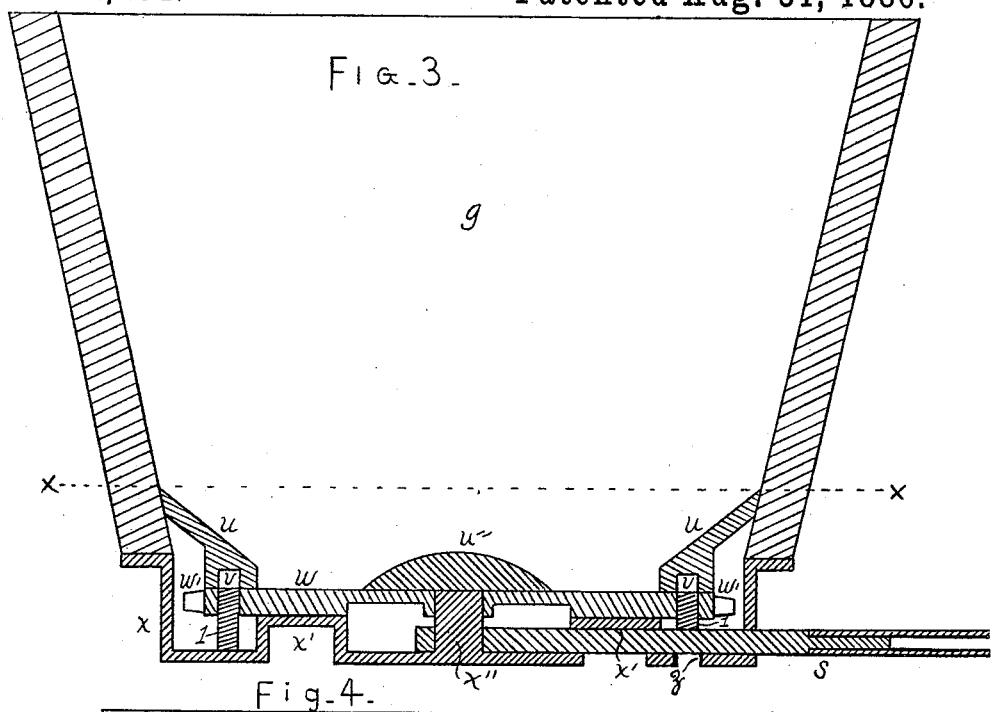
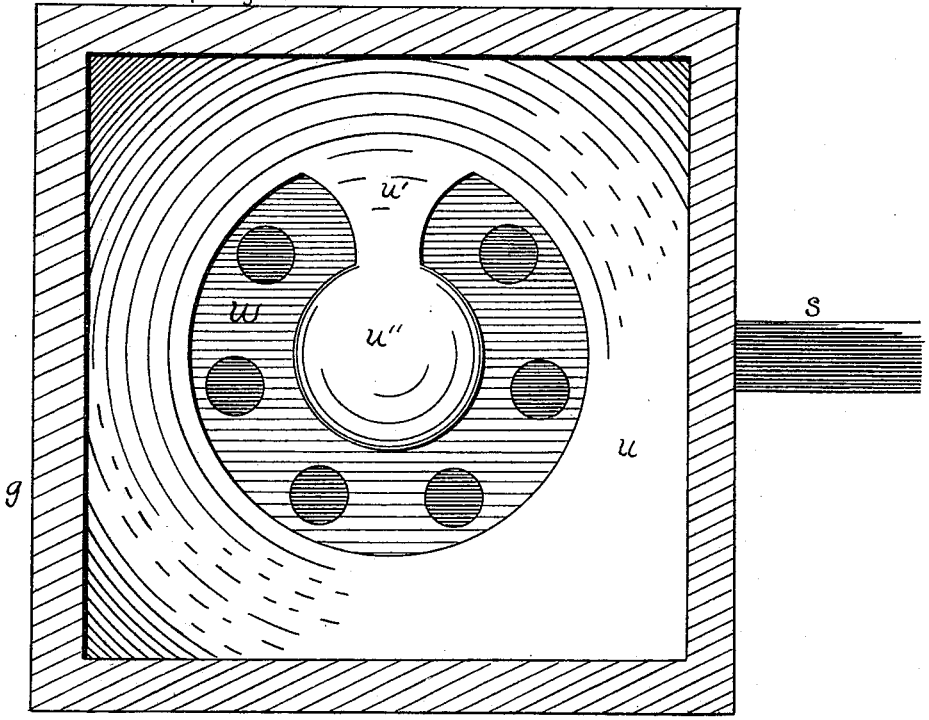
WITNESSES
P. D. Walker
A. M. Smyser
INVENTOR
W. S. GREENING.
By L. P. Graham
Atty.

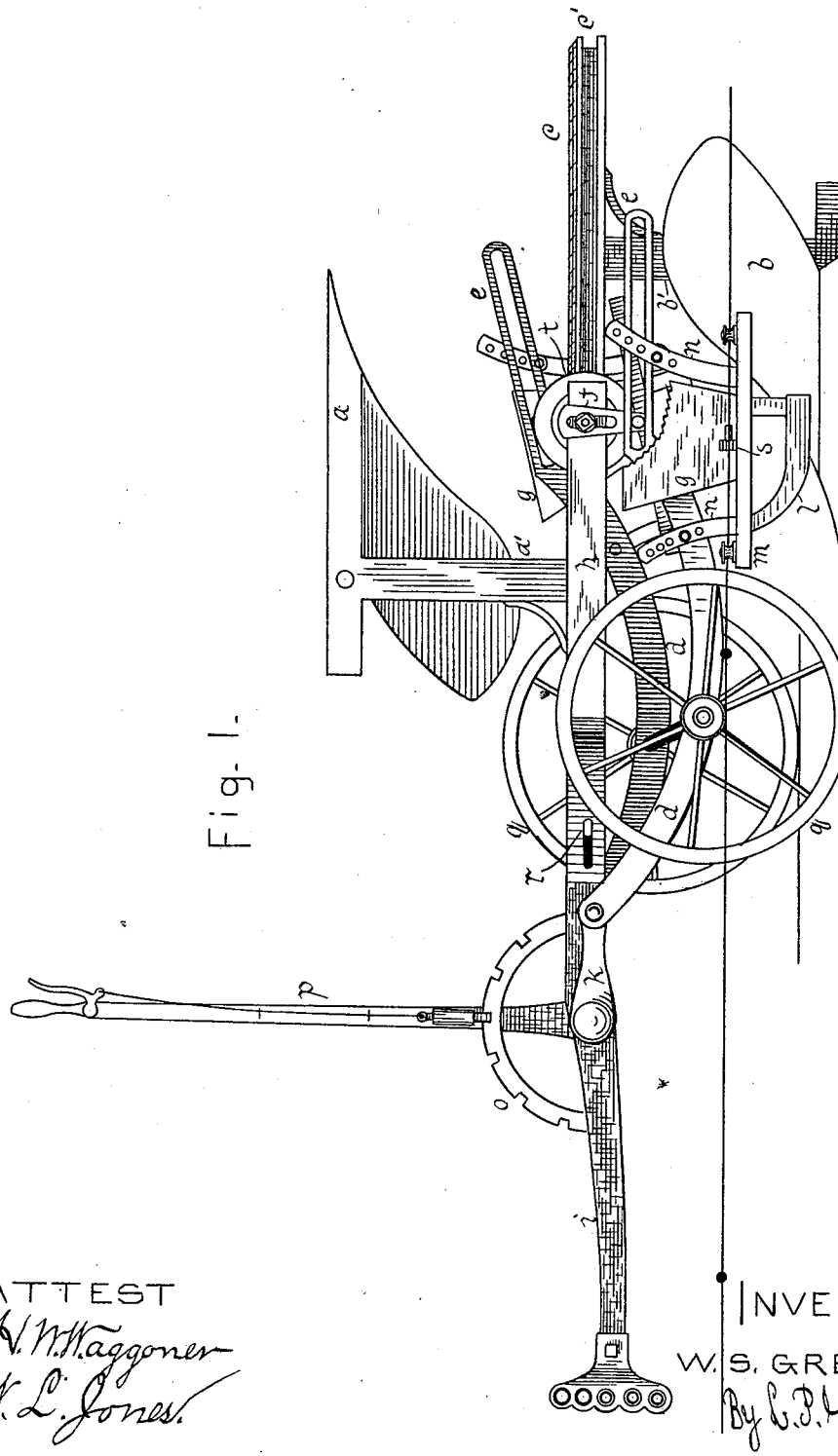

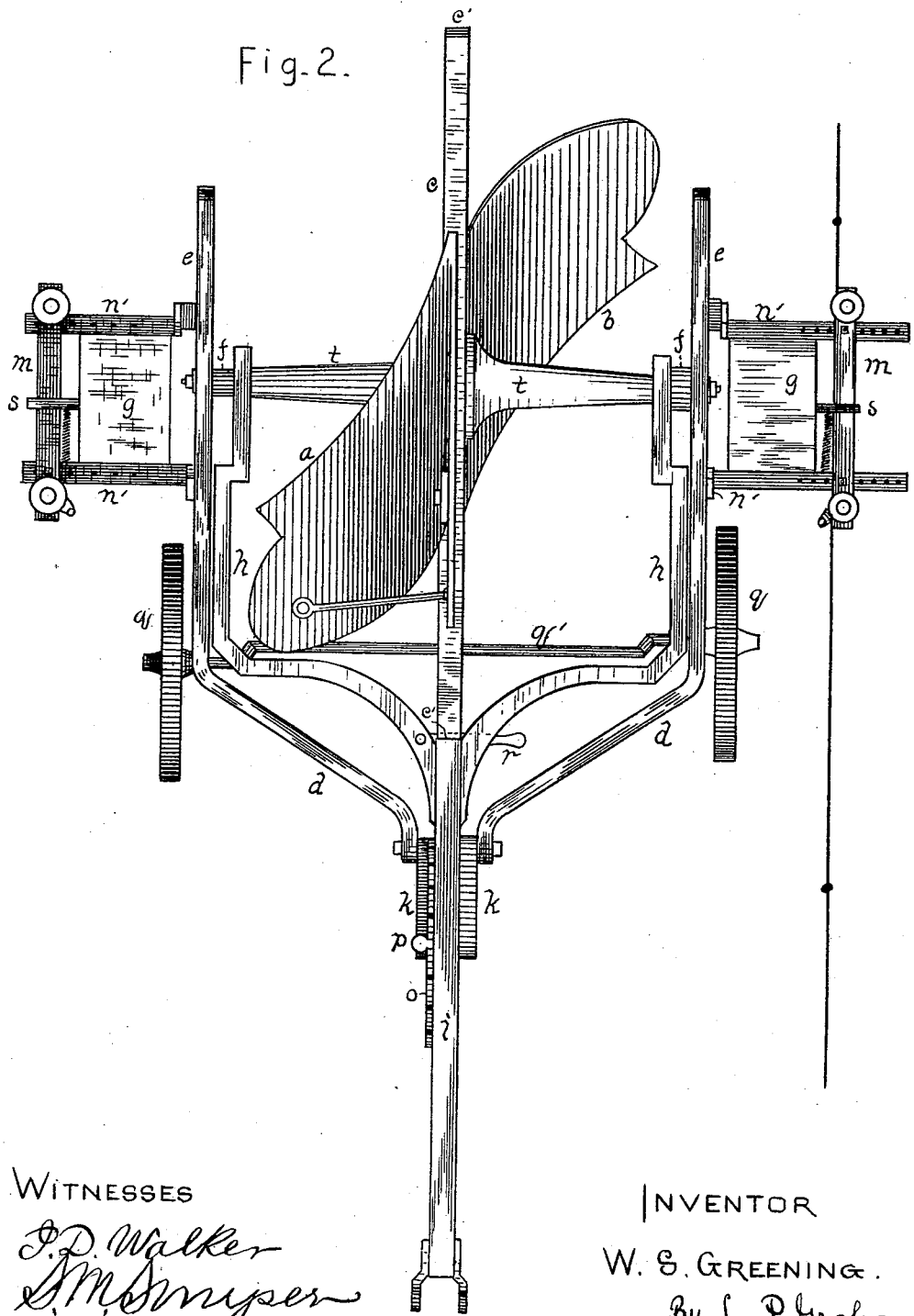

(No Model.)　　　　　　　　　　　　　　　　　　　5 Sheets—Sheet 4.
W. S. GREENING.
COMBINED PLOW AND PLANTING MECHANISM.
No. 348,204.　　　　　　　　　　　　　Patented Aug. 31, 1886.

WITNESSES
J. D. Walker
S. M. Smyser

INVENTOR
W. S. GREENING
By L. P. Graham
atty.

(No Model.) 5 Sheets—Sheet 5.

W. S. GREENING.
COMBINED PLOW AND PLANTING MECHANISM.

No. 348,204. Patented Aug. 31, 1886.

WITNESSES.
J. P. Walker
J. M. Smyser

INVENTOR
W S GREENING
By L. P. Graham
atty.

UNITED STATES PATENT OFFICE.

WINFIELD S. GREENING, OF DECATUR, ILLINOIS.

COMBINED PLOW AND PLANTING MECHANISM.

SPECIFICATION forming part of Letters Patent No. 348,204, dated August 31, 1886.

Application filed February 3, 1886. Serial No. 190,666. (No model.)

*To all whom it may concern:*

Be it known that I, WINFIELD S. GREENING, of the city of Decatur, county of Macon, and State of Illinois, have invented certain new and useful Improvements in Corn-Planting Mechanism, of which the following is a specification.

My invention consists in a combined plow, corn-planter, and check-rower, having peculiarities of construction and arrangement both generally and specifically, as hereinafter set forth and claimed, whereby the ground may be planted as fast as plowed.

Figure 5:
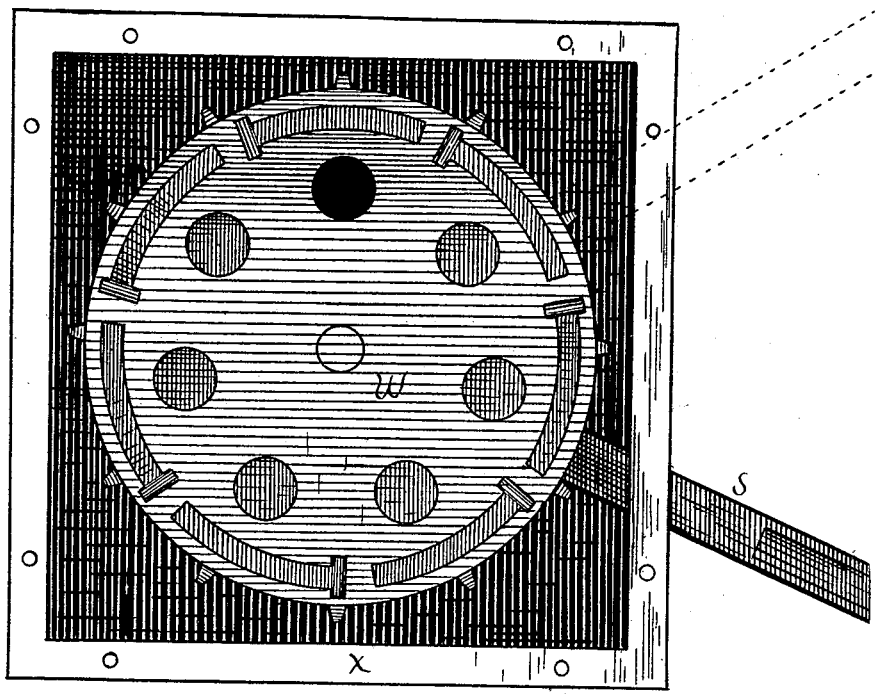
Figure 6:
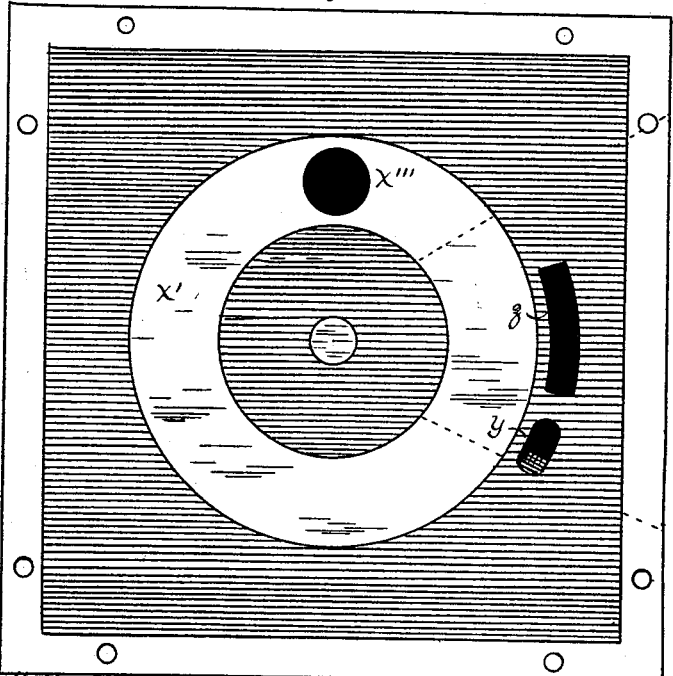
Figure 7:
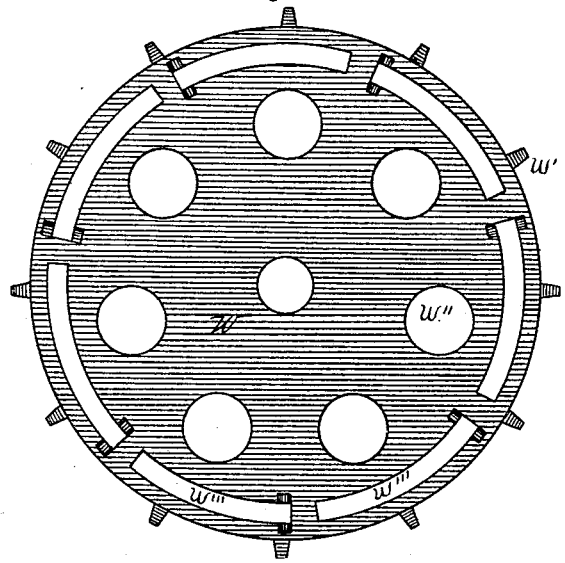
Figure 8:
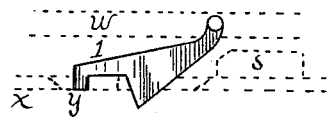
Figure 9:
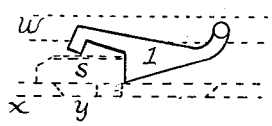
Figure 10:
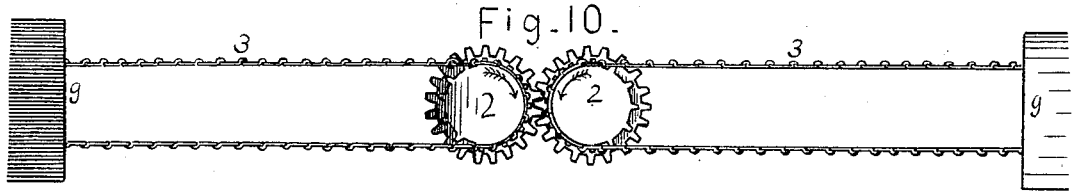

In the drawings accompanying and forming a part of this specification, Figure 1 is a side elevation of my device. Fig. 2 is a plan of the same. Fig. 3 is a central vertical section of a seed-box. Fig. 4 is a horizontal section of a seed-box at the altitude indicated by dotted line $x$ in Fig. 3. Fig. 5 is a plan of an exposed seed-plate in the bottom of the seed-box. Fig. 6 is a plan of the bottom of the seed-box. Fig. 7 is a plan of a seed-plate. Fig. 8 is an elevation of a pawl in position to act as a lock for the seed-plate. Fig. 9 shows said pawl in position to impart the motion of the check-row lever to the seed-plate; and Fig. 10 shows mechanism that enables the motion of one seed-plate to be imparted in a contrary direction to the other seed-plate.

$a$ represents a right-hand plow rigidly connected by means of bar $a'$ with rotative beam $c$.

$b$ represents a left-hand plow rigidly connected with beam $c$ by means of bar $b'$.

$c$ represents a plow-beam pivoted at its longitudinal center, having recesses $c'$ in its ends, and carrying plows $a$ and $b$ equidistant from the pivot on opposite sides thereof and on opposite sides of the beam.

$d$ $d$ are wheel-carrying arms pivoted to bent lever $k$ and provided with slotted terminations $e$ $e$.

$f f$ are crank-arms rigid with beam $c$ and concentric with the pivot thereof, from which they extend in opposite directions and engage the slotted terminations of arms $d$ $d$.

$g$ $g$ represent the seed-boxes, which with the check-row mechanism are connected with the wheel-arms in a manner to be hereinafter set forth.

$h$ is the draft-frame with which the various parts of my device are connected.

$i$ is a draft-beam that may, if preferred, be extended into a tongue.

$l$ are shoes or runners for the corn-planting mechanism, constructed in any suitable manner and suitably connected with the seed-boxes.

$m$ are check-row bars, adjustably supported by frame $n$ $n'$, which is connected with the wheel-arms by means of bolts, as indicated.

$o$ is an arc-formed rack on beam $i$.

$p$ is a lever having bent and bifurcated extensions $k$, on which arms $d$ $d$ are pivoted and also provided with a spring-bolt that engages the depressions in rack $o$.

$q$ $q$ are the wheels of the planter.

$q'$ is a crank-axle that connects wheels $q$ $q$.

$r$ is a shifting-lever in frame $h$, that holds plow-beam $c$ on a line with draft-beam $i$ by engaging a recess in the end of said plow-beam.

$s$ are the levers that receive motion from the check-row wire and impart the same to the seed-plates of the planter.

$t$ is the axis on which cranks $f$ and plow-beam $c$ rotate.

$u$ is an inclined surface in a seed-box, that carries the grain toward the cells of the seed-plate.

$u'$ is the "cut-off" over the discharge-hole.

$u''$ is a central elevation that assists the lateral incline $u$ in carrying the grain toward the cells.

$v$, Fig. 3, represents a groove in the lower surface of incline $u$, that effects a result in a manner to be hereinafter set forth.

$w$ is the seed-plate, having sprocket-teeth $w'$, seed-cells $w''$, and slots $w'''$.

$x$ is the bottom of the seed-hopper, having elevated surface $x'$ and pivot $x''$.

$y$ is a lock-slot in the bottom of the seed-hopper, and $z$ is a slot in the same that permits free motion in the lock-pawls.

1, Figs. 8 and 9, represents a form of pawl, one of which works in each of the slots $w'''$ and co-operates with the check-row lever to rotate the seed-plate and with the bottom of the hopper to stop said rotation.

2, in Fig. 10, represents a pair of combined sprocket and gear wheels that may co-operate with chains 3 to impart the motion of one seed-plate in a reversed direction to the other seed-plate, in case it should be desired to use both plates at one time in the manner of an ordinary planter.

In operation the field is traversed with the plows in the position shown. When the end of the field is reached, lever r is disengaged from the recess in the end of beam c, frame h is elevated by depressing the bent end k of lever p, and the plow-beam is given a semi-revolution longitudinally, reversing the position of the plows and the relative arrangement of the wheels and planting mechanism. This operation is repeated each time the end of the field is reached, the left-hand plow being used alternately with the right-hand plow. After a width has been plowed corresponding to the distance between rows, the check-row wire is put in use and a row of corn planted in the side of the furrow last plowed, about midway of the same. By providing two seed-boxes with dropping mechanism a row may be planted while the plow is crossing the field in either direction, and in all cases the check-row wire, when not in operation, may lie on the plowed ground entirely out of the way. By means of crank-shaft $q'$ the different positions heretofore accredited to the wheels may be readily attained, and firm bearings at the same time be provided.

The check-row mechanism consists in seed-plates w, provided with slots $w'''$, a series of pawls pivoted in slots $w'''$ and provided with downwardly-extending catches that engage a slot in the bottom of the hopper. The pawls are each provided with lugs that fit in corresponding recesses in the slots and pivot freely therein. The plate u fits over the lugs of the pawls and prevents dislocation thereof, while groove v permits free vibration in the rear ends of said pawls.

Forked lever s pivots on pin $x''$, and engages with the pawls, as indicated by dotted lines in Fig. 9. When the seed-plate has been rotated the distance between cells, the pawl next following the one in contact with the lever drops into lock-slot y and stops the rotation of the plate. The lever is thrown forward by the knots on a check-row wire, and is returned automatically by a suitable spring. At each automatic return the lever passes under the pawl that has just occasioned a stop in the rotation of the seed-plate, and raises the same clear of the lock-slot. (See Fig. 9.) The pawls when not in operation slide around on the bottom of the hopper until slot y is reached, when they successively act first as locks and afterward as drive-pawls, as before stated.

The casing of bottom x and elevated portion $x'$ are laterally slotted to admit lever s, and permit its perfect operation, (see dotted lines in Fig. 6,) and under all circumstances the seed-plate stops with a cell over discharge-opening $x'''$, the elevated surface $x'$ of bottom x retaining the grain in the cells until said opening is reached.

Having thus described my invention, I claim as new and desire to secure by Letters Patent—

1. In plows, in combination, a draft-frame, a transverse axle in the rear of the draft-frame, a right-hand plow and a left-hand plow oppositely arranged on the axle, and having rotation in the direction of the line of draft, means whereby either plow may be held in operative contact with the ground, cranks on opposite ends of the axle extending in opposite directions, a pair of arms pivotally connected with the front of the draft-frame and also connected rearwardly with the cranks of the axle, and wheels having bearings on said arms, as and for the purpose set forth.

2. In plows, in combination, a draft-frame, a transverse axle in the rear of the draft-frame, a right-hand plow and a left-hand plow oppositely arranged on the axle and having rotation in the direction of the line of draft, means whereby either plow may be held in operative contact with the ground, cranks on opposite ends of the axle extending in opposite directions, a pair of arms pivotally connected with the front of the draft-frame in a manner permitting vertical adjustment and also connected rearwardly with the cranks of the axle, and wheels having bearings on said arms.

3. In plows, in combination, a draft-frame, a transverse axle in the rear of the draft-frame, a right-hand plow and a left-hand plow oppositely arranged on the axle and having rotation in the direction of the line of draft, means whereby either plow may be held in operative contact with the ground, cranks on opposite ends of the axle extending in opposite direrection, a lever on the front of the draft-frame, the weight end of which is vertically adjustable, a pair of arms pivotally connected with the weight end of the lever and also connected rearwardly with the cranks of the axle through longitudinal slots, and wheels having bearings on said arms, as and for the purpose set forth.

4. In plows, in combination, a draft-frame, a transverse axle in the rear of the draft-frame, a beam rigid on said axle and having recessed ends, a right-hand plow and a left-hand plow oppositely arranged with reference to the beam and axle and having rotation in the direction of the line of draft, a lever in the draft-frame in position to engage a recess of the beam and hold said beam in a horizontal position, cranks on opposite ends of the axle extending in opposite directions, a pair of arms pivotally connected with the front of the draft-frame and also connected rearwardly with the cranks of the axle by means of longitudinal slots, and wheels having bearings in said arms, as and for the purpose set forth.

5. In plows, in combination, a draft-frame, a transverse axle in the rear of the draft-frame, a right-hand plow and a left-hand plow oppositely arranged on the axle and having rotation in the direction of the line of draft, means whereby either plow may be held in operative contact with the ground, cranks on opposite ends of the axle extending in opposite directions, a pair of arms pivotally connected with the front of the draft-frame and also connected rearwardly with the cranks of the axle, wheels having bearings on the arms, and a bent axle for said wheels extending through the wheels and arms, as and for the purpose set forth.

6. In corn-planting mechanism, in combination, a drop-plate on a vertical pivot having a series of slots concentric with the pivot, a series of lock-pawls swung in the slots in a manner permitting free vertical motion in the rear ends thereof, and an oscillating lever under the plate in position to engage the pawls successively, as and for the purpose set forth.

7. In corn-planting mechanism, in combination, a drop-plate on a vertical pivot having a series of slots concentric with the pivot, a series of lock-pawls swung in the slots and permitting free vertical motion in their rear ends, an oscillating lever under the plate in position to engage and operate the pawls, and a non-rotating plate below the lever having a single lock-slot in which the pawls may successively drop, as and for the purpose set forth.

8. In corn-planting mechanism, in combination, drop-plate $w$, having cells $w''$ and slots $w'''$, pawls 1, pivoted in slots $w'''$, so that their rear ends may have free vertical motion, plate $x$ under the drop-plate, having elevated portion $x'$, pivot $x''$, and slot $y$, and oscillating lever $s$, between the drop-plate and plate $x$, as and for the purpose set forth.

9. In corn-planting mechanism, in combination, plate $w$, having perforations $w''$ and slots $w'''$, inclined plate $u$, having groove $v$, pawls 1, of the conformation shown, adjusted to operate in slots $w'''$, plate $x$, having elevated surface $x'$, pivot $x''$, perforation $x'''$, and slots $y$ and $z$, and bifurcated lever $s$, between plates $w$ and $x$, as and for the purpose set forth.

WINFIELD S. GREENING.

Attest:
L. P. GRAHAM,
JESSE FISHER.